(12) United States Patent
Rodriguez et al.

(10) Patent No.: US 8,117,362 B2
(45) Date of Patent: Feb. 14, 2012

(54) PROGRAMMABLE MULTI-FUNCTION Z-WAVE ADAPTER FOR Z-WAVE WIRELESS NETWORKS

(75) Inventors: Yan Rodriguez, Suwannee, GA (US); Ben Garcia, Cumming, GA (US)

(73) Assignee: HomeRun Holdings Corporation, Pensacola, FL (US)

( * ) Notice: Subject to any disclaimer, the term of this patent is extended or adjusted under 35 U.S.C. 154(b) by 190 days.

(21) Appl. No.: 12/191,912

(22) Filed: Aug. 14, 2008

(65) Prior Publication Data
US 2010/0042764 A1 Feb. 18, 2010

(51) Int. Cl.
*G06F 12/02* (2006.01)
*G06F 13/12* (2006.01)

(52) U.S. Cl. ............ 710/72; 710/8; 710/9; 710/10; 710/62; 710/64; 710/63; 710/313; 711/103; 711/E12.008

(58) Field of Classification Search ............. 710/8–10, 710/62–64, 72–74, 313
See application file for complete search history.

(56) References Cited

U.S. PATENT DOCUMENTS

| | | | |
|---|---|---|---|
| 7,108,560 B1 * | 9/2006 | Chou et al. | 439/660 |
| 7,117,288 B2 * | 10/2006 | Huang | 710/313 |
| 7,532,872 B2 * | 5/2009 | Lazzarotto et al. | 455/226.1 |
| 7,924,174 B1 * | 4/2011 | Gananathan | 340/999 |
| 2006/0205359 A1 * | 9/2006 | Brooks | 455/73 |
| 2008/0026764 A1 * | 1/2008 | Shimura et al. | 455/446 |

OTHER PUBLICATIONS

"ControlThink Introduces Z-Wave Enabled Platform for Mass Market Windows SideShow Enabled Remotes" by CE Pro Editors Sep. 5, 2007 http://www.cepro.com/article/controlthink_introduces_z_wave_enabled_platform_for_mass_market_windows_sid/.*
CONTROLTHINK::THINKSTICK Mar. 2008 Http://www.controlthink.com/accessories/zwusb100.htm.*
Z-Wave Developer's Kits v4.X for Wireless Networking Apr. 18, 2005 http://www.zen-sys.com/modules/Products&Techonology/?id=33&chk=5b22312658d556869c744c205909f8b3.*
CONTROLTHINK releases Firmware-Upgradable Z-Wave USB Adapter Mar. 31, 2008 http://www.reuters.com/article/pressrelease/idUS191216+31-Mar-2008+BW20080331.*
http://www.equinox-tech.com/downloads/equinox/tools/epsilon5/EPSILON5_User_Manual_V112_010807.pdf.*
http://www.smarthus.info/support/download/zwave/Z-Wave%20Node%20Type%20Overview%20and%20Network.pdf.*

* cited by examiner

*Primary Examiner* — Tammara Peyton
(74) *Attorney, Agent, or Firm* — Baker & Hostetler LLP

(57) ABSTRACT

The present invention provides a programmable multi-function adapter for a wireless network that includes a wireless communications module, a control module, a data communications interface and a programmable non-volatile memory. The data communications interface is coupled to the control module, while the programmable non-volatile memory is coupled to the control module and the wireless communications module. The programmable non-volatile memory stores information accessible by the control module and the wireless communications module.

22 Claims, 5 Drawing Sheets

PROGRAMMABLE MULTI-FUNCTION Z-WAVE ADAPTER FOR Z-WAVE WIRELESS NETWORKS

FIELD OF THE INVENTION

The present invention relates generally to transfer and management of data in electronic form. More particularly, the present invention relates to a programmable multi-function adapter for acquiring, transmitting, and monitoring data within a wireless network.

BACKGROUND OF THE INVENTION

Radio-based command systems for functions such as building automation, and the narrower functional range associated with residential automation, are available using a plurality of technologies. Among numerous technologies recognized and in use are X10®, Zigbee®, and Z-Wave® technologies. Of particular interest herein is Z-Wave technology, originally developed by Zensys, Inc. and supported by a consortium of users and product developers. Z-Wave standards, available through Zensys and the Z-Wave Alliance, are controlled by the consortium.

Typical Z-Wave terminal devices, commonly sensing or power switching apparatus or remote control units for such, include printed wiring assemblies (circuit boards) whereon Z-Wave modules, integrated circuits, and other components are affixed to form a product. Other than a one-time programming event, typical Z-Wave products (other than controllers) interface with premises electrical wiring and with RF messages.

Z-Wave Controllers accumulate network mesh connectivity based on polling and reports. In accordance with Z-Wave standards and specifications, Z-Wave terminal devices respond to messages from Z-Wave controllers to self-identify, to poll their surroundings for other terminal devices, and to report their connectivity within a network. Controllers then use accumulated mesh connectivity information to develop so-called "scenes" wherein any number of terminal devices within system limits may be set to specific values.

Current Z-Wave mesh network interface apparatus and methods primarily restrict functionality to systems of controllers and terminal devices, augmented with limited interface to security operations. Such apparatus and methods do not interface to general-purpose computers as host devices or support dynamic reconfiguration of terminal device functionality. Such apparatus and methods are further limited with respect to modes of operation, having a single mode of operation capable of configuration acquisition, setup of scenes, and command of execution of scenes. It is potentially useful at least to extend Z-Wave network functionality to provide a plurality of operating modes, to interface to host devices, to provide passive monitoring and logging of Z-Wave network operation, to provide signal boosting, and to reconfigure functionality of Z-Wave devices.

SUMMARY OF THE INVENTION

Embodiments of the present invention provide a programmable multi-function adapter for a wireless network that includes a wireless communications module, a control module, a data communications interface and a programmable non-volatile memory. The data communications interface is coupled to the control module, while the programmable non-volatile memory is coupled to the control module and the wireless communications module. The programmable non-volatile memory stores information accessible by the control module and the wireless communications module.

There have thus been outlined, rather broadly, certain features of the invention in order that the detailed description thereof that follows may be better understood, and in order that the present contribution to the art may be better appreciated. There are, of course, additional features of the invention that are described below and form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. It is also to be understood that the phraseology and terminology employed herein, as well as the abstract, are for the purpose of description, and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
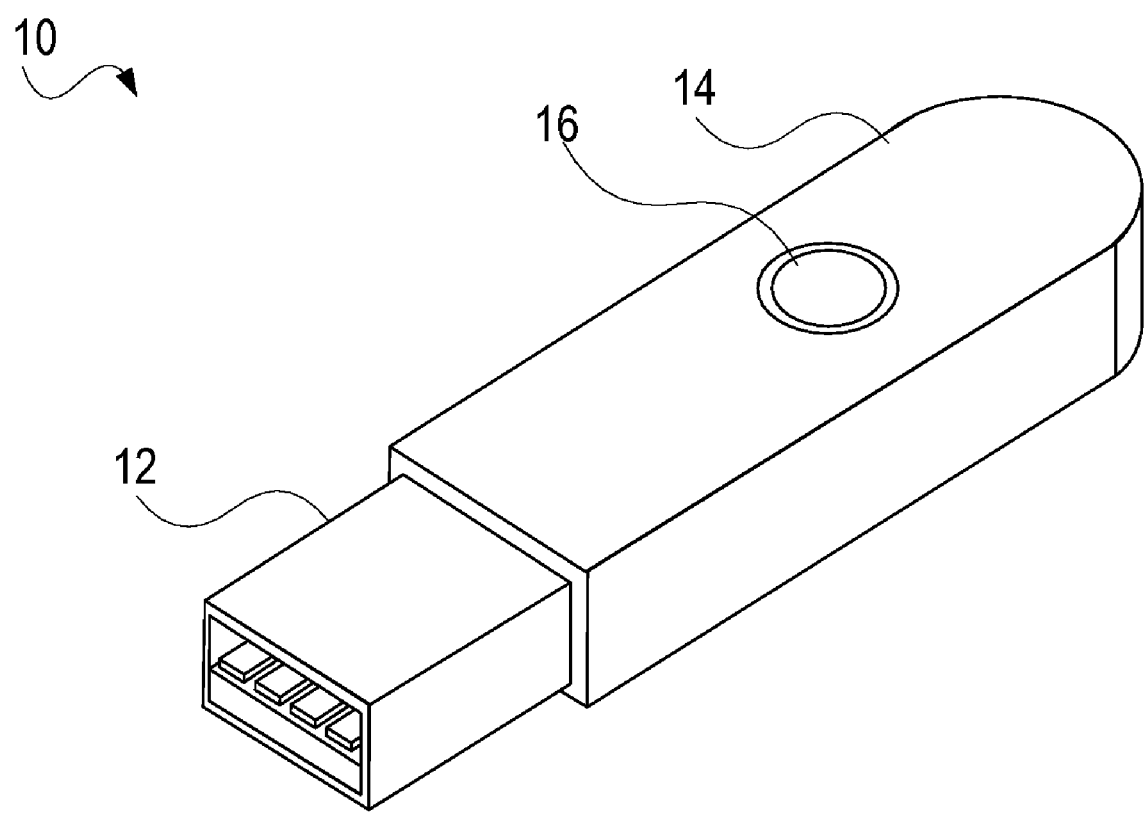
FIG. 1 depicts a perspective view of a programmable multi-function adapter for a wireless network, in accordance with an embodiment of the present invention.

FIG. 1 depicts a perspective view of a programmable multi-function adapter for a wireless network, in accordance with an embodiment of the present invention.

Programmable multi-function adapter 10 includes Universal Serial Bus (USB) connector 12, housing 14 and status indicator 16. Generally, housing 14 encloses one or more wireless communications modules or components, programmable logic devices, processors, memories, etc. In alternative embodiments, the functions performed by the programmable multi-function adapter 10 may be embodied within other electronic devices that have been configured in accordance with the teachings of the instant specification.

A preferred embodiment of the present invention supports at least each major version of the USB standard, i.e., USB 1.0 (Jan. 1996), USB 1.1 (Sep. 1998) and USB 2.0 (Apr. 200), while support for future releases, such as USB 3.0, is also contemplated. In this preferred embodiment, USB connector 12 is a Type A plug, and the programmable multi-function adapter 10 may be referred to as a "USB Stick." Support for other communication standards is also contemplated by the present invention, including, for example, IEEE 1394, Firewire 400, Firewire 800, i.LINK, etc. In these alternative embodiments, USB connector 12 is replaced by the appropriate hardware interface.

In a preferred embodiment, status indicator 16 is a light emitting diode (LED) that emits light in a controllable fashion in order to convey status information to a user, such as, for example, by varying the intensity of the light according to a predetermined frequency or frequency sequence, pattern, etc. Alternative embodiments may include two or more LEDs, a multi-colored light source, etc. Status indicator 16 may be viewed through a lens disposed within housing 14, or, alternatively, status indicator 16 may be viewed through an area of reduced thickness or opacity molded within housing 14. As discussed herein, status indicator 16 may convey information associated with the current operational mode, memory access, re-programming status, etc.

Figure 2:
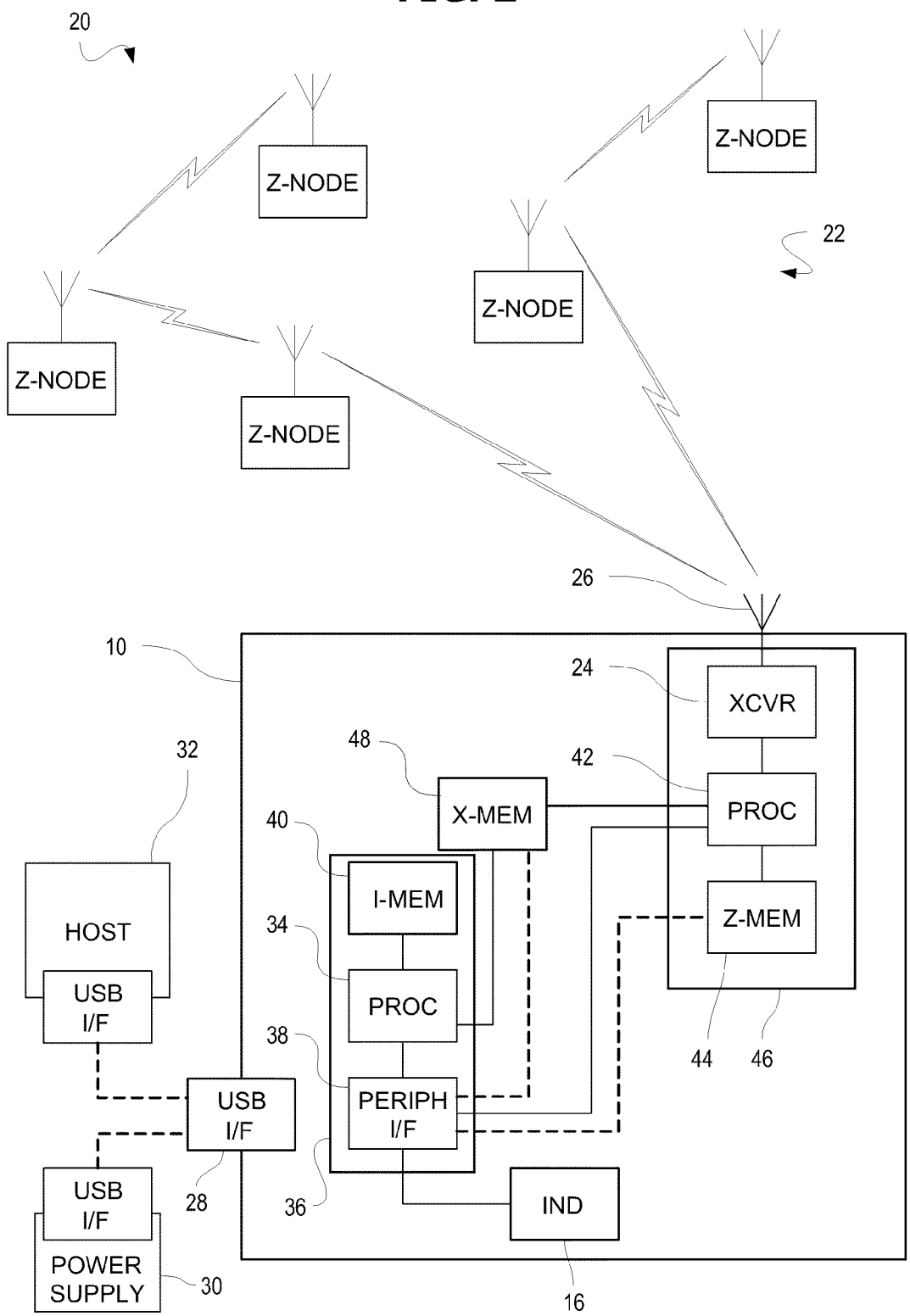
FIG. 2 depicts a system block diagram in accordance with an embodiment of the present invention.

FIG. 2 depicts a system block diagram 20 in accordance with an embodiment of the present invention.

Generally, programmable multi-function adapter 10 wirelessly couples to wireless network 22, and draws power from power supply 30 or host computer system 32. Additionally, when connected, information may be transmitted to and from host computer system 32. In this embodiment, programmable multi-function adapter 10 includes USB interface 28, control module 36, such as, for example, a field programmable gate array (FPGA), internal memory 40 (e.g., "I-MEM"), externally-accessible memory 48 (e.g., "X-MEM"), indicator 16 and wireless communications module 46, such as, for example, a Z-Wave module. Control module 36 includes a processor 34 and a peripheral interface 38, implemented, for example, as one or more functional blocks within an FPGA, while wireless communications module 46 includes a transceiver 24 and antenna 26, processor 42 and internal memory 44 (e.g., "Z-MEM"). Control module 36 is connected to USB interface 28, indicator 16, internal memory 40, externally-accessible memory 48 and wireless communications module 46. In one embodiment, peripheral interface 38 may be coupled to externally-accessible memory 48 and internal memory 44 (as shown by dashed lines).

In one embodiment, processors 34 and 42, as well as internal memories 40 and 44, are implemented as separate and distinct functional blocks, while in alternative embodiments, the respective functionalities may be implemented as various combinations of components, such as, for example, a single processor or processor block and a single memory, etc.

In one preferred embodiment, both the control module 36 and the wireless communications module 46 are connected to externally-accessible memory 48, which may be an EEPROM, for example. In this embodiment, externally-accessible memory 48 is independently accessible by control module 36 and the wireless communications module 46, so that each component may read and/or write data independently thereto. Externally-accessible memory 48 may be physically separate from internal memory 40, as depicted in FIG. 2, or, alternatively, internal memory 40 and externally-accessible memory 48 may be provided within a single memory chip or device.

In another preferred embodiment, programmable multi-function adapter 10 includes processing and storage capabilities, i.e., e.g., processor 34 and internal memory 40, that provide functions that are separate and distinct from those provided by wireless communications module 46. Such functionality includes, for example, operating mode selection and control, signal routing, system fault response, report generation, status indicator 16 control, etc.

In one embodiment, programmable multi-function adapter 10 supports reading and writing executable processor code and data from and to internal memory 44 (e.g., "Z-MEM"), in addition to both internal memory 40 and externally-accessible memory 48. In a preferred embodiment, the wireless communications module 46 is a Z-Wave module and this capability advantageously provides field-reprogrammability, a feature that is unavailable for Z-Wave modules and devices after they are deployed. For example, the functionality of Z-Wave communications module 46 may be changed by modifying the executable code stored in Z-MEM 44, by modifying the operational data and/or parameters stored in Z-MEM 44, by modifying the wireless network configuration data, such as, for example, the mesh linkage for wireless network 22, etc. Accordingly, the functionality of the Z-Wave communications module 46 may be upgraded to conform to the latest Z-Wave specifications.

For Z-Wave network devices that have been appropriately configured, similar upgradeability may be provided. For example, host computer system 32 may issue commands to programmable multi-function adapter 10, over the USB interface, that sends reprogrammability information to specific Z-Wave devices. This information may include executable code, data, operating parameters, etc., thereby providing a defense against obsolescence.

In another Z-Wave embodiment, Z-Wave communications module 46 may acquire mesh configuration data for wireless network 22, and then store these data in Z-MEM 44, or, alternatively, in X-MEM 48. From these memories, control module 36 can then transfer these data to X-MEM 48 (if appropriate), I-MEM 40, or to host computer system 32 via USB interface 28. Similarly, control module 36 can receive Z-Wave device commands, instructions, configuration data, etc., from host computer system 32 via USB interface 28, optionally store these data in I-MEM 40 and/or X-MEM 48, and then transfer these data to X-MEM 48 (if appropriate) and/or Z-MEM 44. For example, control module 36 can receive Z-Wave network mesh configuration data from host computer system 32, via USB interface 28, and transfer then these data directly to Z-MEM 44, optionally storing these data in I-MEM 40 or X-MEM 48. This feature may be advantageously coupled with a convenient user interface, provided by the host computer system 32, for data entry, management, etc., as described in more detail below.

Figure 3:
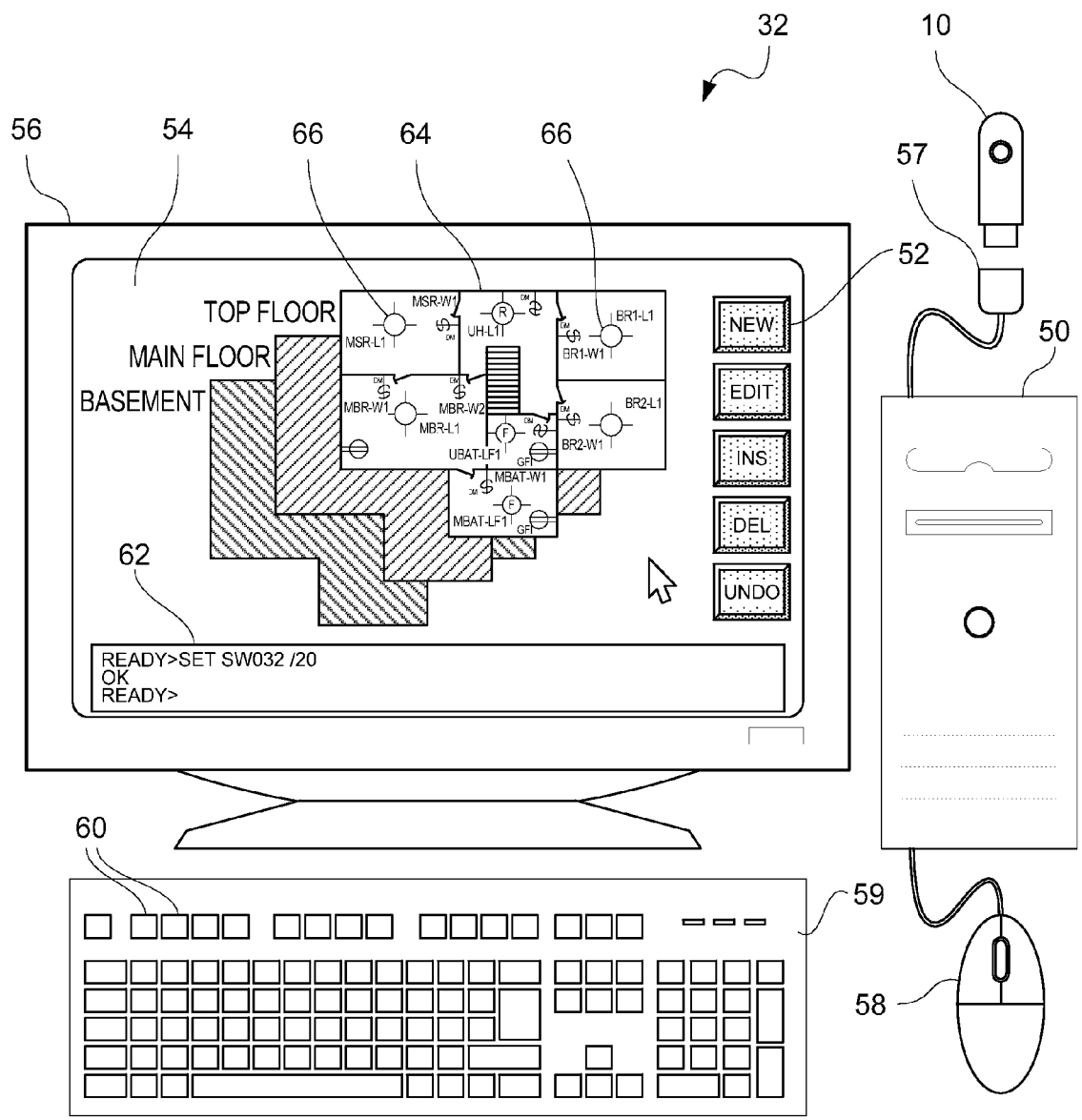
FIG. 3 depicts another system block diagram in accordance with an embodiment of the present invention.

FIG. 3 depicts another system block diagram in accordance with an embodiment of the present invention.

Host computer system 32 includes a computer or server 50, USB connector 57, display 56 with graphical user interface (GUI) 54, mouse 58 and keyboard 59. Programmable multi-function adapter 10 is connected to USB connector 57 to provide both power and signal connectivity, or, alternatively, only power connectivity, as described in more detail below. In a preferred embodiment, USB interface 28 includes a Type A plug, while USB connector 57 is a Type A receptacle; other connector types and configurations are also contemplated, such as USB Type B, Mini-A, Mini-B, etc., as well as other communications standards, e.g., IEEE 1394, Firewire, i.LINK, etc., as noted above.

When connected to programmable multi-function adapter 10, host computer system 32 may function as a general network controller, and in Z-Wave embodiments, host computer system 32 may function as a Z-Wave network controller. In these Z-Wave embodiments, home automation scene activation is performed by host computer system 32 in response to various preset indicators, such as, for example, time-of-day, day-of-the-week, predetermined sunrise/sunset times, etc. Dynamic indicators may also be provided, including, for example, measured sunrise/sunset times, sound or motion detector events, temperature measurements, thermostat events, telephonic or Internet messages, etc.

In the embodiment depicted in FIG. 3, GUI 54 includes "soft buttons" 52, selectable by mouse 58 click, a function-key 60 press, command line interface 62 entry, etc., that allow the user to interact with the Z-Wave software executing on host computer system 32. GUI 54 may advantageously include a graphical representation of a home automation installation 64, in which the locations of Z-Wave terminal devices 66 within the home automation installation 64 is represented. Z-Wave terminal devices 66 are graphically depicted by type using various symbols, and a reference number may be assigned to each one. Known Z-Wave network controller devices are generally less sophisticated, particularly from a graphical perspective.

Figure 4:
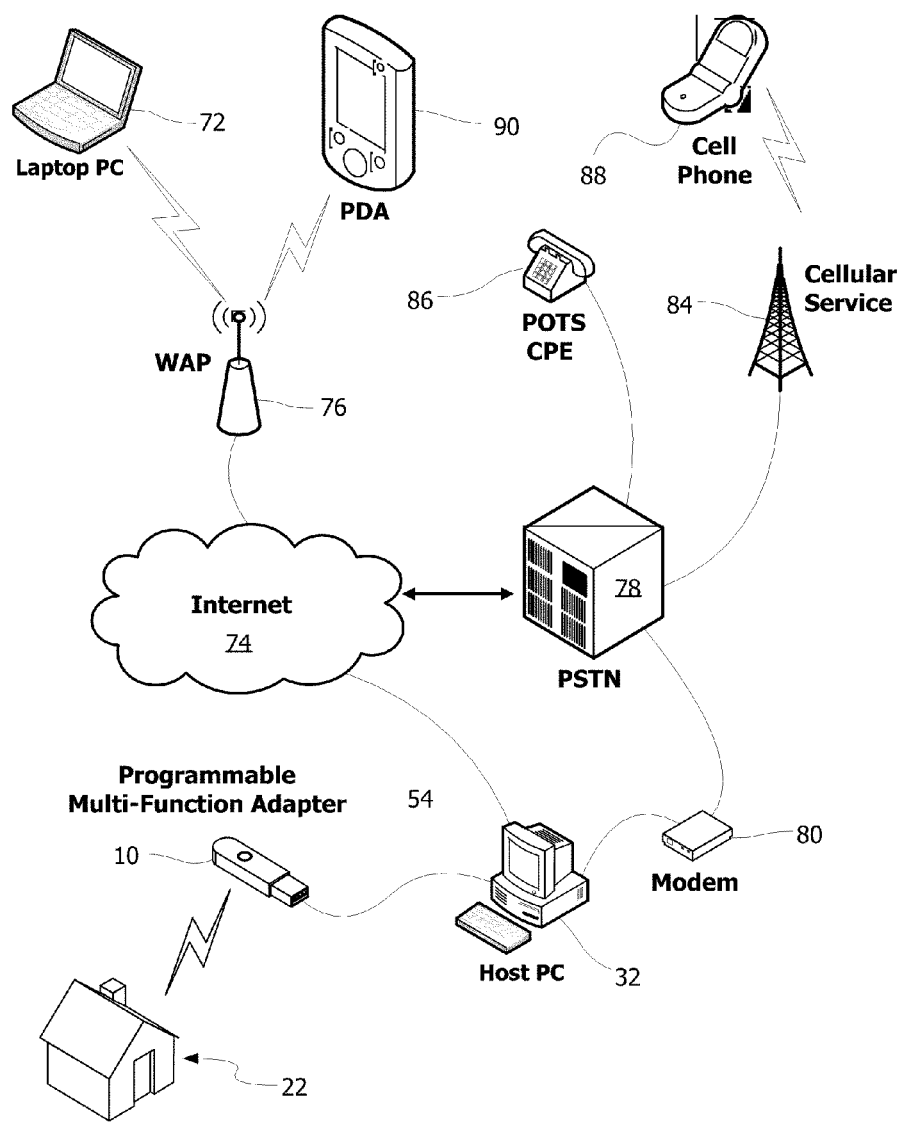
FIG. 4 depicts a further system block diagram in accordance with an embodiment of the present invention.

FIG. 4 depicts a further system block diagram, in accordance with an embodiment of the present invention.

When connected, programmable multi-function adapter 10 and host computer system 32 provide various remote access capabilities to the wireless network 22. For example, host computer system 32 may be connected to the Internet 74, using a cable modem (not shown), fiber-optic connection, etc., while remote wireless devices 72 and 90 may be connected to the Internet 74 through a wireless access point (WAP) 76. Remote devices 74 and 90 may send commands to the host computer system 32, through wireless access point (WAP) 76 and the Internet 74, to configure the wireless network 22, as well as receive data from the host computer system 32 relating to the wireless network 22.

Host computer system 32 may also be connected to the public switched telephone network (PSTN) 78, using a modem 80, while remote telephonic devices 86 and 88 are connected to PSTN 78 directly or through cellular service provider 84, respectively. Remote telephonic devices 86 and 88 may send commands to the host computer system 32, through the PSTN 78 and cellular provider 84, respectively, to configure the wireless network 22, as well as receive data from the host computer system 32 relating to the wireless network 22. Of course, the remote devices 72 and 90 may also be directly connected to the Internet 74, while the PSTN 78 may also be connected to the Internet 74 through appropriate gateways.

Figure 5:
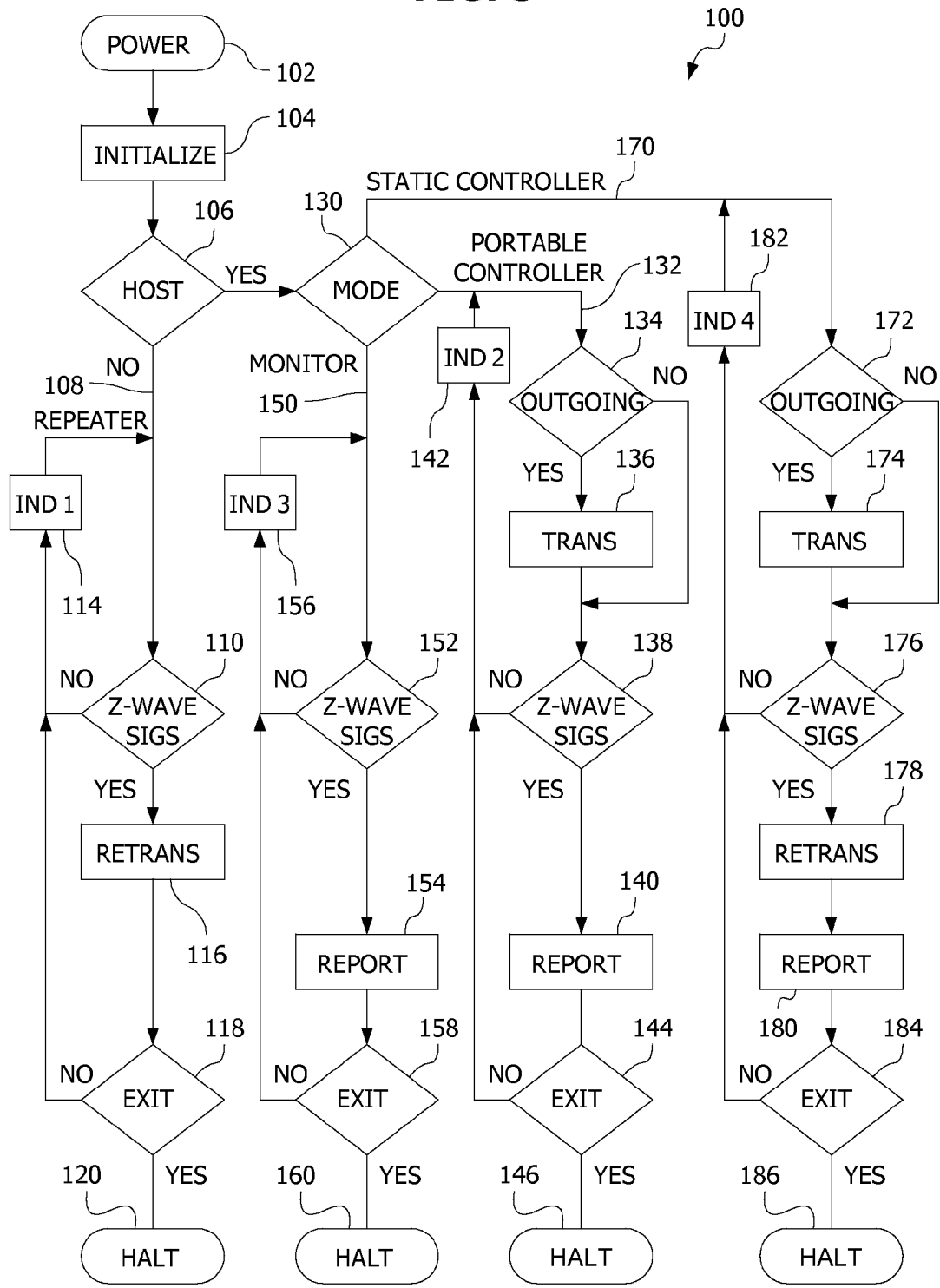
FIG. 5 presents a flowchart illustrating the general operation of a programmable multi-function adapter in accordance with embodiments of the present invention.

FIG. 5 presents a flowchart illustrating the general operation of the programmable multi-function adapter 10 in accordance with embodiments of the present invention. While described with reference to Z-Wave embodiments, one skilled in the art will recognize that the depicted operational methodology is applicable to other wireless network architectures and protocols.

The present invention contemplates the use of different programming techniques, selection of which may be dependent upon many factors, such as, for example, hardware design, preferred programming practices, etc. In the "tight loop" programming embodiment described below, program flow pauses until a test result changes state, indicating that a particular event has occurred. Generally, interrupt-based operation provides responses for a variety of events, the nature of which depends upon the design of the interrupt handler. Other programming techniques that provide functionality equivalent to that discussed herein are also contemplated by the present invention.

Operation (100) of the programmable multi-function adapter 10 begins with the application (102) of power, such as, for example, through the outboard signal pair on USB connector 12. Initialization (104) follows power application (102), which generally includes such ubiquitous processes as power-on reset, clock adjustment, memory clearing, register configuration, etc. If one or more FPGAs are used within the programmable multi-function adapter 10, initialization also includes reloading of processor and interface function images from non-volatile memory.

Following initialization (104), programmable multi-function adapter 10 searches (106) for a host computer system 32. In a preferred embodiment, search (106) includes participating in the standard USB enumeration process provided by a USB host, such as the host computer system 32. If the search (106) for the host computer system 32 fails, then programmable multi-function adapter 10 enters repeater mode (108). For example, the search (106) may fail because the inboard signal lines of USB connector 57 are not engaged with the respective inboard signals lines of USB connector 12, because the host computer system 32 did not successfully enumerate the programmable multi-function adapter 10 within a certain time period, etc.

While the programmable multi-function adapter 10 is operating in repeater mode (108), communications module 46 checks (110) for a network broadcast transmission, such as a Z-Wave signal. If a network broadcast transmission signal is not detected after a certain time period, control module 36 sends a control signal to indicator 16 to display (114) indicator mode 1 (e.g., "IND 1"), in which indicator 16 displays a characteristic color, intensity, frequency, etc., and the method returns to check (110) for a network broadcast transmission. On the other hand, if a network broadcast transmission is detected, communications module 46 retransmits (116) the network broadcast signal and sends a signal to control module 36, which, in response, sends a signal to indicator 16 to display (114) indicator mode 1. The method then returns to check (110) for another network broadcast transmission.

In Z-Wave embodiments of repeater mode, Z-Wave communications module 46 retransmits (116) Z-Wave messages autonomously. Retransmission (116) includes such steps as detecting a signal above a noise floor in an assigned channel, extracting initialization symbols, addresses, data, and validation codes, validating the message content in accordance with Z-Wave specifications, and, if valid, retransmitting the original Z-Wave message. By contrast, a Z-Wave terminal device does not respond to a Z-Wave message unless the Z-Wave terminal device detects a matching address in the Z-Wave message. And, if a matching address is detected, the Z-Wave terminal device either executes the command encoded in the Z-Wave message and transmits a Z-Wave acknowledgement message, or the Z-Wave terminal device modifies the Z-Wave message and retransmits the modified Z-Wave message. In either case, the original Z-Wave is not retransmitted.

Generally, control module 36 monitors various operational parameters associated with the programmable multi-function adapter 10, such as, for example, input voltage levels, etc. Should any operational parameter fall outside predefined limit(s), control module 36 exits (118) repeater mode and halts (120) the operation of the programmable multi-function adapter 10.

If the search (106) for the host computer system 32 is successful, such as, for example, if the host computer system 32 successfully enumerates the programmable multi-function adapter 10, then the programmable multi-function adapter 10 enters either a controller mode or a monitor mode. In a preferred embodiment, programmable multi-function adapter 10 enters one of three operational modes (130): a portable controller mode (132), a static controller mode (170) or a monitor mode (150). In one embodiment, the selection of a particular operational mode depends upon the information exchanged between host computer system 32 and the programmable multi-function adapter 10 during the enumeration process. Additionally, it may also be desirable to handle operational mode changes through messaging, device interrupt service routines, etc.

If the host computer system 32 does not identify a particular operational mode (130) during the enumeration process, then the programmable multi-function adapter 10 enters a default mode, such as, for example, the portable controller mode (132).

During portable controller mode (132) operation, commands may be transmitted from the host computer system 32 to the programmable multi-function adapter 10 over USB interface 28, and messages, including commands, reports, data, etc., may be transmitted from other wireless devices to the programmable multi-function adapter 10 over the wireless network 22. Wireless messages received from these devices may be processed by the programmable multi-function adapter 10, or, alternatively, these messages may be forwarded to the host computer system 32 over USB interface 28. In a preferred Z-Wave embodiment, the wireless messages may be received directly from the Z-Wave device or, alternatively, the wireless messages may be relayed from a sequence of Z-Wave devices. In some embodiments, the programmable multi-function adapter 10 independently creates and transmits messages over wireless network 22 for delivery to one or more wireless devices.

While the programmable multi-function adapter 10 is operating in portable controller mode (132), control module 36 generally processes messages and commands received from the host computer system 32 at outgoing block (134), and, if appropriate, wireless communications module 46 creates and transmits (136) messages over wireless network 22 for delivery to one or more wireless devices. Additionally, communications module 46 also checks (138) for a network broadcast transmission, such as a Z-Wave signal. If a network broadcast transmission signal is not detected after a certain time period, control module 36 sends a control signal to indicator 16 to display (142) indicator mode 2 (e.g., "IND 2"), in which indicator 16 displays a characteristic color, intensity, frequency, etc., and the method returns to outgoing block (134). On the other hand, if a network broadcast transmission is detected, communications module 46 notifies control module 36, which reports (140) the message to the host computer system 32, and, assuming normal operation, sends a control signal to indicator 16 to display (142) indicator mode 2.

As described above, control module 36 monitors various operational parameters associated with the programmable multi-function adapter 10, such as, for example, input voltage levels, etc. Should any operational parameter fall outside predefined limit(s), control module 36 exits (144) portable controller mode and halts (146) the operation of the programmable multi-function adapter 10.

During static controller mode (170) operation, commands may be transmitted from the host computer system 32 to the programmable multi-function adapter 10 over USB interface 28, and messages, including commands, reports, data, etc., may be transmitted from other wireless devices to the programmable multi-function adapter 10 over the wireless network 22, in a manner similar to portable controller mode (132). Additionally, communications module 46 may also check (176) for network broadcast transmissions, such as Z-Wave signals, in a manner similar to repeater mode (108). If a network broadcast transmission is detected, communications module 46 retransmits (178) the network broadcast signal and sends a signal to control module 36, which, in response, sends a signal to indicator 16 to display (182) indicator mode 4.

More particularly, while the programmable multi-function adapter 10 is operating in static controller mode (170), control module 36 generally processes messages and commands received from the host computer system 32 at outgoing block (172), and, if appropriate, wireless communications module 46 creates and transmits (174) messages over wireless network 22 for delivery to one or more wireless devices. Additionally, communications module 46 also checks (176) for a network broadcast transmission, such as a Z-Wave signal. If a network broadcast transmission signal is not detected after a certain time period, control module 36 sends a control signal to indicator 16 to display (182) indicator mode 4 (e.g., "IND 4"), in which indicator 16 displays a characteristic color, intensity, frequency, etc., and the method returns to outgoing block (172). On the other hand, if a network broadcast transmission is detected, communications module 46 notifies control module 36, which reports (180) the message to the host computer system 32, and, assuming normal operation, sends a control signal to indicator 16 to display (182) indicator mode 4.

As described above, control module 36 monitors various operational parameters associated with the programmable multi-function adapter 10, such as, for example, input voltage levels, etc. Should any operational parameter fall outside predefined limit(s), control module 36 exits (184) portable controller mode and halts (186) the operation of the programmable multi-function adapter 10.

During monitor mode (150) operation, communications module 46 simply checks (152) for network broadcast transmissions, such as Z-Wave signals, in a manner similar to repeater mode (108). If a network broadcast transmission is detected, communications module 46 notifies control module 36, which reports (154) the message to the host computer system 32, and, assuming normal operation, sends a control signal to indicator 16 to display (182) indicator mode 3 (e.g., "IND 3"), in which indicator 16 displays a characteristic color, intensity, frequency, etc., and the method returns to check (152). No retransmission is provided in monitor mode (150).

As described above, control module 36 monitors various operational parameters associated with the programmable multi-function adapter 10, such as, for example, input voltage levels, etc. Should any operational parameter fall outside predefined limit(s), control module 36 exits (158) portable controller mode and halts (160) the operation of the programmable multi-function adapter 10.

Generally, monitor operational mode (150) supervises wireless network 22 operation, and logs event for host computer system 32 for various purposes, such as, for example, verification of overall functionality, monitoring of data rates, performing troubleshooting, generating detailed reports for remote supervision, providing indirect security, etc. Other applications for this capability are also contemplated by the present invention.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A programmable multi-function adapter for a wireless network, comprising:

a wireless communications module, including a transceiver, a first processor and
a first non-volatile, field-reprogrammable memory, and which communicates with a plurality of wireless network devices;
a control module, coupled to the wireless communications module, including a second processor and a second non-volatile memory;
a data communications interface, coupled to the control module, including wired, data and power connections within a shared connector; and
a third programmable non-volatile memory coupled to the control module and the wireless communications module, that stores wireless communications module information received at least from the wireless communications module and accessible by the at least one of the control module and the wireless communication module.

2. The programmable multi-function adapter recited by claim 1, wherein the data communications interface is a Universal Serial Bus.

3. The programmable multi-function adapter recited by claim 1, wherein the wireless communications module is a Z-Wave communications module.

4. The programmable multi-function adapter recited by claim 1, wherein the data communications interface is coupled to a host computer and the third programmable non-volatile memory stores wireless communications module information received from the host computer.

5. The programmable multi-function adapter recited by claim 1, wherein the control module and the wireless communications module further comprise:
a processor-equipped hardware and processor-executable software structure of the adapter, operative to cause the adapter to enter into a plurality of modes, in the alternative, wherein the modes include at least a repeater mode and an operational mode; and
a function selector operative to command a distinct operational sequence in each of the plurality of adapter modes.

6. The programmable multi-function adapter recited by claim 5, wherein, during repeater mode operation, the wireless communications module receives a plurality of wireless network messages from a wireless network device, verifies each wireless network message, and retransmits each verified wireless network message.

7. The programmable multi-function adapter recited by claim 5, wherein the plurality of operational modes includes a monitor mode and, during monitor mode operation, the wireless communications module receives a plurality of wireless messages from the plurality of wireless network devices, and the control module sends each wireless message to a host computer coupled to the data communications interface.

8. The programmable multi-function adapter recited by claim 5, further comprising an indicator that has a plurality of indicator modes associated with the plurality of operational modes.

9. The programmable multi-function adapter recited by claim 5, wherein the function selector further comprises:
a reset upon power application function;
a USB enumeration search function;
a USB enumeration host recognition function;
a USB enumeration host recognition failure decision function; and
an adapter mode selection function that sets the adapter into an operational mode in event of success in performing USB enumeration and that sets the adapter into repeater mode in event of failure in performing USB enumeration.

10. The programmable multi-function adapter recited by claim 5, wherein, in operational mode, the function selector comprises:
a hardware and software structure operative to direct the wireless communications module to receive a plurality of wireless messages from a wireless network device; and
a hardware and software structure operative to direct the control module to send each wireless message to a host computer coupled to the data communications interface.

11. The programmable multi-function adapter recited by claim 10, wherein the function selector further comprises:
a hardware and software structure operative to recognize and accept a host command to function in a mode selected from the list comprising a static controller mode, a portable controller mode, and a monitor mode.

12. The programmable multi-function adapter recited by claim 11, wherein, during static controller mode operation:
the wireless communications module verifies each wireless message, and retransmits each verified wireless message;
the control module receives a plurality of commands from the host computer, coupled to the data communications interface; and
the wireless communications module creates and transmits a plurality of respective wireless messages associated with the commands.

13. The programmable multi-function adapter recited by claim 11, wherein, during portable controller mode operation:
the control module receives a plurality of commands from the host computer, coupled to the data communications interface via the USB port; and
the wireless communications module creates and transmits a plurality of respective wireless communications messages associated with the commands.

14. A method for updating a Z-Wave communications module, comprising:
coupling a Z-Wave communications module to a host computer using a Universal Serial Bus interface;
receiving Z-Wave information from the host computer; and
storing the Z-Wave information in a first field-reprogrammable non-volatile memory coupled to the Z-Wave communications module, wherein
a control module is connected to Z-Wave communications module, the control module including a second non-volatile memory; and
coupling a third programmable non-volatile memory coupled to the control module and the Z-wave communications module, that stores Z-wave communications module information received at least from the Z-wave communications module and accessible by the at least one of the control module and the Z-wave wireless communication module.

15. The method recited by claim 14, wherein the first field-reprogrammable non-volatile memory is disposed within the Z-Wave communications module.

16. The method recited by claim 14, wherein the Z-Wave information includes executable code.

17. The method recited by claim 14, wherein the Z-Wave information includes data associated with one or more Z-Wave devices within a wireless network coupled to the Z-Wave communications module.

18. The method recited by claim 14, further comprising indicating a status of said storing the Z-Wave information using a light emitting diode coupled to the Z-Wave communications module.

19. A method for accessing a Z-Wave communications module, comprising:
- coupling a Z-Wave communications module to a host computer using a Universal Serial Bus interface;
- reading Z-Wave information stored in a first field-reprogrammable non-volatile memory component of the Z-Wave communications module; and
- sending the Z-Wave information to the host computer using a control module including a second programmable non-volatile memory; and
- coupling a third programmable non-volatile memory coupled to the control module and the Z-wave communications module, that stores Z-wave communications module information received at least from the Z-wave communications module and accessible by the at least one of the control module and the Z-wave wireless communication module.

20. The method recited by claim 19, wherein the second programmable non-volatile memory is disposed outside the Z-Wave communications module.

21. The method recited by claim 19, wherein the Z-Wave information includes data associated with one or more Z-Wave devices within a wireless network coupled to the Z-Wave communications module.

22. The method recited by claim 19, further comprising indicating a status of said reading the Z-Wave information using a light emitting diode coupled to the Z-Wave communications module.

* * * * *